US006201089B1

(12) United States Patent
Carter (10) Patent No.: US 6,201,089 B1
(45) Date of Patent: Mar. 13, 2001

(54) MACROPOROUS HYPERHYDROXY POLYMER AND ARTICLES MADE THEREFROM

(76) Inventor: James T Carter, 94 Galli Dr., A-1, Novato, CA (US) 94949

( * ) Notice: Subject to any disclaimer, the term of this patent is extended or adjusted under 35 U.S.C. 154(b) by 0 days.

(21) Appl. No.: 09/151,111

(22) Filed: Sep. 10, 1998

(51) Int. Cl.[7] .................. C08F 220/06; C08F 216/04; C08F 218/02
(52) U.S. Cl. .................. 526/320; 526/317.1; 526/318.4; 526/321; 526/323.1; 526/323.2; 526/328; 526/328.5
(58) Field of Search ................ 526/320, 317.1, 526/318.4, 328, 321

(56) References Cited

U.S. PATENT DOCUMENTS

| Re. 27,401 | | 6/1972 | Wichterle et al. . | |
|---|---|---|---|---|
| 3,234,134 | * | 2/1966 | Rockett et al. | 526/320 |
| 3,244,631 | * | 4/1966 | van der Voort | 526/320 |
| 3,367,992 | * | 2/1968 | Bearden | 526/320 |
| 3,412,074 | * | 11/1968 | Derrick | 526/320 |
| 3,499,862 | | 3/1970 | Wichterle . | |
| 3,766,132 | * | 10/1973 | Lee, Jr. et al. | 526/320 |
| 3,775,537 | * | 11/1973 | Lehmann et al. | 526/320 |
| 3,780,003 | | 12/1973 | Seymour et al. . | |
| 3,963,685 | * | 6/1976 | Abrahams | 526/320 |
| 3,985,697 | | 10/1976 | Urbach . | |
| 4,275,183 | | 6/1981 | Kuzma . | |
| 4,495,313 | | 1/1985 | Larsen . | |
| 4,529,747 | | 7/1985 | Kato et al. . | |
| 4,574,140 | * | 3/1986 | Sandstrom et al. | 526/320 |
| 4,656,237 | * | 4/1987 | Weber, Jr. | 526/320 |
| 4,680,336 | | 7/1987 | Larsen et al. . | |
| 5,011,275 | | 4/1991 | Mueller . | |
| 5,311,223 | | 5/1994 | Vanderlaan . | |
| 5,442,023 | * | 8/1995 | Argyropoubs et al. | 526/320 |
| 5,457,140 | | 10/1995 | Nunez et al. . | |
| 5,532,289 | | 7/1996 | Benz et al. . | |
| 5,612,416 | * | 3/1997 | McCollum et al. | 526/320 |
| 5,661,194 | | 8/1997 | Ando et al. . | |

\* cited by examiner

*Primary Examiner*—Fred Zitomer (57) ABSTRACT

The present invention provides a macroporous hyperhydroxy polymer formed from a monomer mixture of substantially similar fractions of functional acrylic monomers which are combined to form a compound having a polymer skeleton which provides a high number of hydroxyl sites. The result is a material which, when hydrated, has a pore size relative to oxygen and water which provides a high ratio of free water to bound water. When formed into contact lenses, the material exhibits oxygen permeability approaching that of a static layer of tears of equal thickness and water contents of 95% or greater. The polymer is also suitable for use as burn dressings, bandages, soil hydratants, surface treatments, lubricants and coatings, absorbents, transport membranes and the like.

7 Claims, 6 Drawing Sheets

MACROPOROUS HYPERHYDROXY POLYMER AND ARTICLES MADE THEREFROM

FIELD OF THE INVENTION

The present invention is directed to a macroporous hyperhydroxy polymer formed from a monomer mixture of substantially similar fractions of functional acrylic monomers which are combined to form a compound having a polymer skeleton which provides a high number of hydroxyl sites. The result is a material which, when hydrated, has a pore size relative to oxygen and water which provides a high ratio of free water to bound water. When formed into contact lenses, the material exhibits oxygen permeability approaching that of a static layer of tears of equal thickness and water contents of 95% or greater. The polymer is also suitable for use as burn dressings, bandages, soil hydratants, surface treatments, lubricants and coatings, absorbents, transport membranes and the like.

BACKGROUND OF THE INVENTION

Hydrophilic polymers having suitable properties for soft contact lenses have been produced in the past by crosslinking major amounts of a single hydroxyethyl methacrylate with a diester crosslinking agent. Those polymers typically exhibit water contents of 50 to 80% by weight when fully hydrated.

It is preferred that hydrophilic contact lens materials have as high a water content as possible so that tear exchange is not limited and corneal respiration is maintained as close to uninterrupted as possible. At the same time, the lens material must have sufficient strength to resist tearing during manufacture and insertion as well as not dissolving under use.

Since oxygen permeability is dependent on the water content of the lens, a greater water content results in increased permeability and, thereby, greater respiration. However, increasing water content requires that the porosity and water holding quality of the hydrophilic polymer be increased which normally results in a decrease in the physical strength of the polymer.

The present invention has determined that a macroporous hyperhydroxy polymer exhibiting a significantly increased water holding capability can be produced from a monomer mixture comprising substantially similar fractions of functional acrylic monomers with a minimum amount of a polymerization initiator. The resulting polymer has a crosslinked skeleton with a pore size of at least 90 Å and a high ratio of free water to solid when hydrated. Water contents of 95% to 99.75% are possible while maintaining sufficient integrity of structure to permit practical use as a material for contact lenses and other uses.

SUMMARY OF THE INVENTION

It is an object of the present invention to provide a macroporous hyperhydroxy polymer having a pore diameter greater than 90 Angstroms.

It is a further object of the present invention to provide a macroporous hyperhydroxy polymer which, upon hydration, has a uniquely high ratio of free water to bound water.

It is a still further object of the present invention to provide a macroporous hyperhydroxy polymer which has the capability of holding upwards of 99.75% water.

It is a further object of the present invention to provide a macroporous hyperhydroxy polymer from a monomer mixture consisting of substantially similar fractions of functional acrylic monomers.

It is an even further object of the present invention to provide a macroporous hyperhydroxy polymer hydrogel formed as a soft contact lens which exhibits a high water content, upwards of 99.75%, and a low coefficient of friction, thereby maintaining corneal respiration and moisturization at nearly uninterrupted levels.

These objectives and others are obtained by the preparation of a macroporous hyperhydroxy polymer from a monomer mixture consisting of substantially similar fractions of functional acrylic monomers.

The macroporous hyperhydroxy polymer comprises:
a) 40–60 parts by weight of a purified monoester of a hydroxyalkyl acrylate having a single olefinic double bond,
b) 40–60 parts by weight of a methacrylic acid,
c) up to 5 parts by weight of a polymerization initiator, wherein the molar ratio of the purified monoester of hydroxyalkyl acrylate to the methacrylic acid is from 1:1 to 2.3:1, and the polymer is capable of holding 90–99.75% water.

The polymer is useful in a method of preparing articles from the macroporous hyperhydroxy polymer essentially comprising substantially similar fractions of functional acrylic monomers, which method comprises:
a) mixing substantially similar fractions of a purified monoester of a hydroxyalkyl acrylate having a single olefinic double bond and a methacryic acid with a sufficient amount of a polymerization initiator,
b) holding the mixture under polymerization conditions to form a polymer gel, and
c) casting the polymer gel to shape,
whereby the article is capable of holding 90–99.75% water.

The polymer exhibits utility in a variety of fields including as a coating for surface treatments such as anti-icing materials, lubricants and the like, as a soil hydratant, as dermatological devices such as bandages, burn dressings, and the like, as chemical transport membranes, as biological implants, and as spill recovery materials. However, a principal use of the polymer is in the fabrication of soft contact lenses which comprise the macroporous hyperhydroxy polymer prepared by polymerizing a mixture comprising:
a) 40–60 parts by weight of a purified monoester of a hydroxyalkyl acrylate having a single olefinic double bond, and
b) 40–60 parts by weight of a methacrylic acid, wherein the lens exhibits a water content of from 90–99.75%.

Further objects and advantages will become apparent from the following description.

DETAILED DESCRIPTION OF THE INVENTION

In accordance with the present invention, a macroporous hyperhydroxy polymer is prepared from a monomer mixture comprising substantially similar fractions of functional acrylic monomers. The resulting polymer skeleton has hydroxy sites in such numbers that, upon hydration, the resulting material has a pore size and volume which is significantly higher than prior polymers of this type.

In particular the hydrated polymer exhibits a uniquely high ratio of free water to bound water which allows for the transport of oxygen and water to be governed by the mechanism of bulk flow of groups of water molecules in concert down a pressure gradient rather than the limited diffusion of single molecules afforded by other polymers. This capillary flow is a significant feature of the polymer when it is formed into a contact lens as it provides for improved transport of oxygen thereby maintaining corneal respiration at nearly uninterrupted levels. In addition, optimum hydration of the cornea is maintained with little or no addition of the saline wetting solutions commonly used with contact lenses.

The polymer is produced from a monomer mixture comprising 40–60 parts by weight of a purified monoester of a hydroxyalkyl alkyl acrylate having a single olefinic double bond, 40–60 parts by weight of a methacrylic acid, and 0.001–5 parts by weight of a polymerization initiator. Polymerization is accomplished by the conventional techniques of bulk polymerization, solution polymerization, suspension polymerization or emulsion polymerization. The polymerization technique used is dependent upon the volume of polymer required and the nature of the final product being produced. The resulting product is a stereospecific isotactic heterogenous copolymer product of a thermoset resin hydrogel in which the molar ratio of monoester to diester is within the range of 1:1 to 2.3:1, preferably 1.5:1, and wherein the pore diameter of the polymer is greater than 90 Angstroms.

As the monoester of a hydroxyalkyl acrylate having a single olefinic double bond, acceptable compounds include, but are not limited to, 2-hydroxyethyl methacrylate, glyceryl methacrylate, 2-hydroxypropyl methacrylate, glycidyl methacrylate, 2-hydroxyethyl acrylate, and 2-hydroxypropyl acrylate. Acceptable methacrylic acid, includes, dimethacrylates.

The polymerization initiator may depend on the method of polymerization or the final intended use of the polymer. For example, where the polymer is to be formed as a solid object, free radical initiators may be used. Preferred initiators of that type include difunctional polyesters such as 2,5-Dimethyl-2,5-bis (2-ethylhexoylperoxy)hexane, or tertiarybutyl peroxypivilate. Alternatively, where the ultimate use of the polymer is as a coating applied in the form of the monomer mixture and polymerized in situ, the initiator may be radiation activated such as UV catalysts 2,2-Azobis(2-methylpropionitrile) or azobisbutyronitrile (AIBN). The initiators are not restricted to use in a particular polymerization method or for a particular final product. For example, the free radical initiators may be employed in coatings and the radiation activated initiators may be employed in the formation of solid articles.

In addition to the substantially similar fractions of the monoester and the methacrylic acid, the monomer mixture may be enhanced with trace amounts of a longer chain alkyl acrylate or methacrylate ester comonomer such as cyclohexyl methacrylate, trimethylolpropane trimethacrylate or ethyleneglycol dimethacrylate. Such additional comonomers enhance the polymer crosslinking for situations where added polymer strength is desired. The trace amounts of these comonomers are generally less than 0.1% by weight of the total monomer mixture.

The hyperhydroxy polymer of the present invention can be formed to produce an article which is sufficiently crosslinked by intrinsic action that the resulting article requires no additional crosslinking monomers. The following example is typical for preparing a polymer having properties suitable for use in making contact lenses.

| | |
|---|---|
| 2-Hydroxyethyl methacrylate | 100 ml (50%) |
| Methacrylic acid | 100 ml (50%) |
| 2,5-Dimethyl-2,5-bis(2-ethylhexoyl-peroxy) hexane | 4 drops (0.0005%) |

The monomer mixture is prepared and polymerized using the method of bulk polymerization and is cast in the form of a cylinder button in an industrial convection oven at 90° C. for 30 minutes. Following this, the polymer is annealed in the oven at 110° C. for six hours. A piece of the polymer is then machined into the form of a contact lens. When immersed in a buffered solution of 0.9N saline and equilibrated in a 0.9N Sorenson solution, the lens has a saline content of 95% and a water to solid ratio of 19:1.

The particular properties of the polymer produced in this example are represented by the cylinder button blank as follows:

Water Content: 95% 0.9% N saline solution @ 25° C.

Index of Refraction: 1.50–dry @ 25° C.
1.33–wet @ 25° C.

Linear Expansion Ratio: 2.35 @ 25° C.

Hardness: >90 (ASTM/Durometer) uniform hardness from blank top to bottom and center to edge Elongation to Break: Exceeds 160% of hydrated diameter Oxygen Transmission: @ 35° C. DK>78.0×10$^{-11}$ (cm$^2$/sec) (ml O$_2$/ml×mm Hg)

Weight: (Dry) 0.8 Gram/Unit Blank (6.0 mm×11.5 mm)

Infrared spectra of the polymer obtained by Fourier Transform Infrared Spectroscopy (FTIR) measured across the range of 4400 to 450 cm$^{-1}$ show bands in the region of 3200 to 2500 cm$^{-1}$ which is characteristic of O—H stretching vibrations from hydroxyl groups, a band of 1710 to 1720 cm$^{-1}$ characteristic of C—O stretching vibrations from ester carbonyl groups and strong bands in the region of 1100 to 1300 cm$^{-1}$ characteristic of C—O stretching vibrations in esters. These bands characterize the polymer as belonging to the polyacrylate group but one which contains an unusually large number of hydroxyl groups which allow the polymer to readily absorb water.

In conducting the measurements, thin film sections of polymer were dried at 65° C. for 4 hours under vacuum and at 100° C. under vacuum for 4 hours. Measurements of these sections were compared with a dried thin film section which was treated with 1 drop of water at hourly intervals for three hours. In this section, the water was completely absorbed by the polymer which showed visible swelling.

Figure 1:
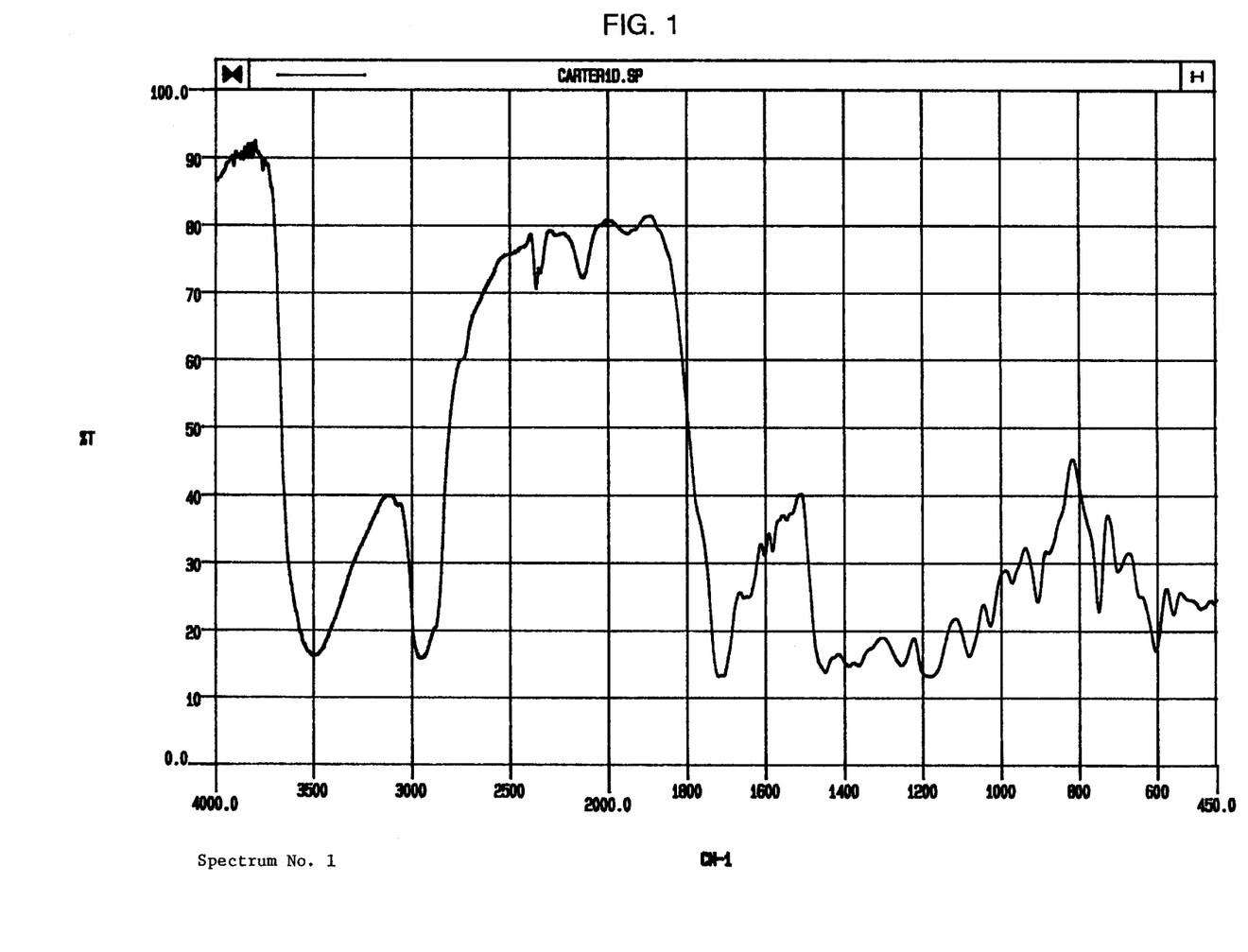
FIG. 1, is an infrared spectrum of the polymer of the invention when dry.
Figure 2:
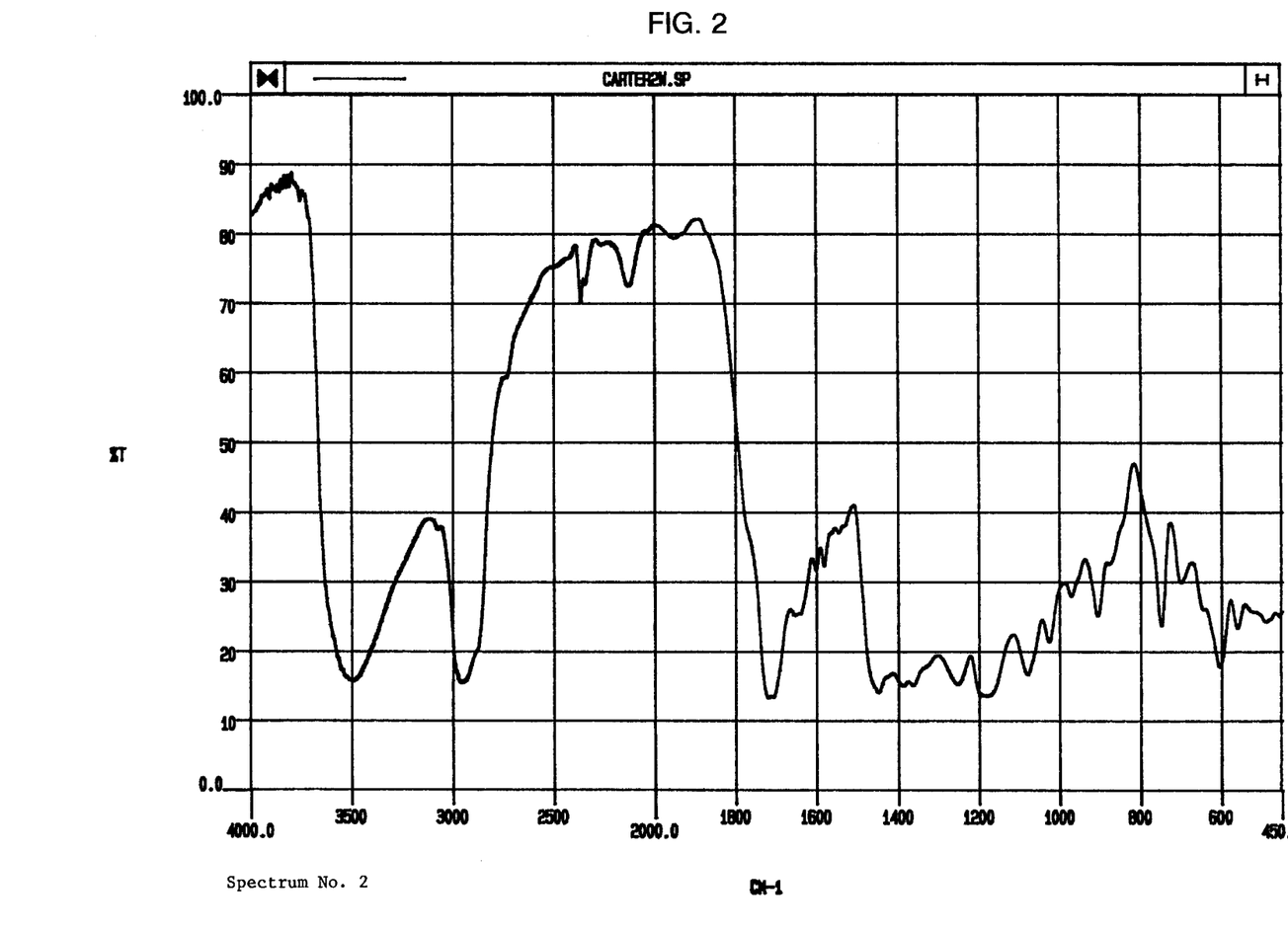
FIG. 2 is an infrared spectrum of the polymer of the invention hydrated at 100% relative humidity.
Figure 3:
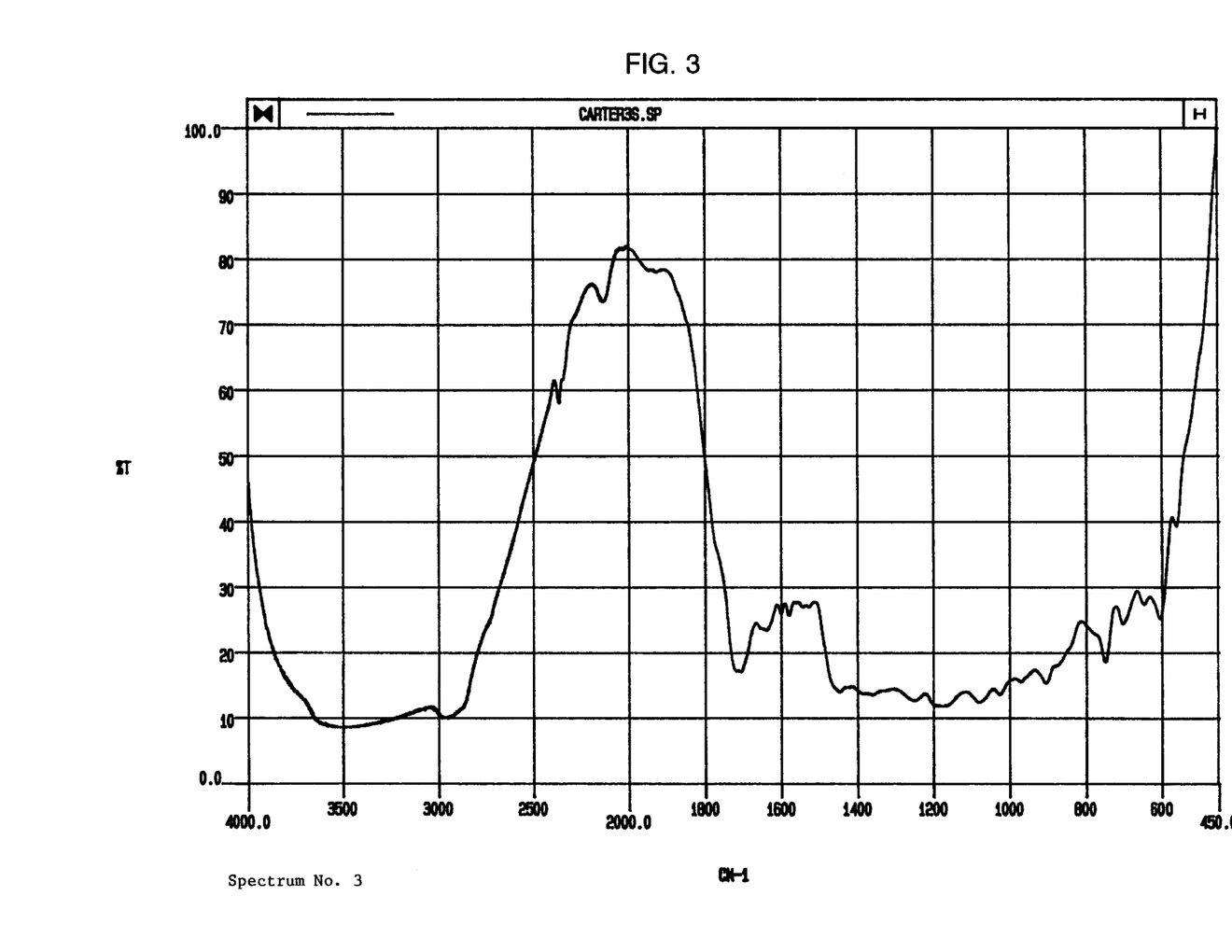
FIG. 3 is an infrared spectrum of the polymer of the invention fully hydrated.
Figure 4:
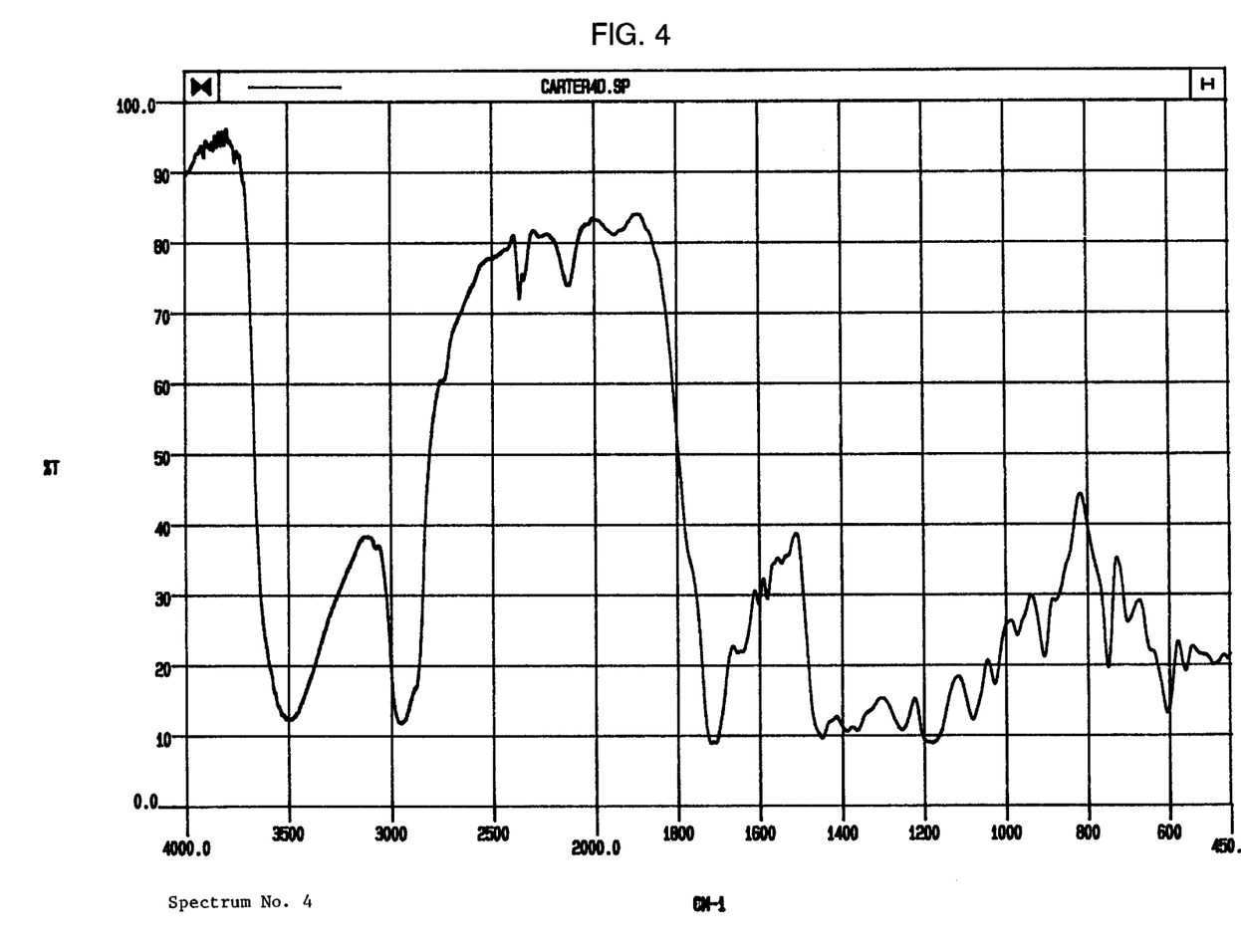
FIG. 4 is an infrared spectrum of the polymer of the present invention dried after being hydrated.

In additional tests, a sample of polymer was placed in a desiccator over magnesium perchlorate for drying. After 72 hours the sample was removed from the desiccator and dried under vacuum for an additional 2 hours and the IR spectrum, FIG. 1, determined in the transmission mode using a Perkin Elmer FTIR Spectrophotometer at a resolution of 4 cm$^{-1}$ for 50 scans and printed at a resolution of 8 cm$^{-1}$. The weight of the sample after drying was measured at 5.03 mg. The sample was then placed in a desiccator for water for 72 hours to allow the polymer to absorb as much water as it could at 100% relative humidity. The sample was removed and the IR spectrum, FIG. 2, determined. The weight of the sample following humidification was measured at 7.01 mg, a 39% weight increase. Following this step, water was added to the sample at the rate of one drop per hour until water showed on the surface. Excess water was blotted off and the IR spectrum, FIG. 3, determined for the fully hydrated polymer. The sample weight was measured at 10.43 mg, a 107% increase. The sample was again dried in the desiccator over magnesium perchlorate for 72 hours and the final dry weight was determined to be 5.01 mg. A final dry spectrum, FIG. 4, was determined.

Swelling upon hydration was small but noticeable (less than 10% change in linear dimension) corresponding to about a 25% volume increase. Water uptake by the resin under 100% relative humidity was of the order of 40% by weight. Despite the high water uptake by the polymer, the spectra changed very little between the dry condition and the hydrated condition at 100% relative humidity. Under saturation, the peak at about 3500 $cm^{-1}$ which represents hydroxyl and water increased in width. Resaturating, FIG. 5, and redrying, FIG. 6, the polymer made minimal changes to the infrared spectra.

Figure 5:
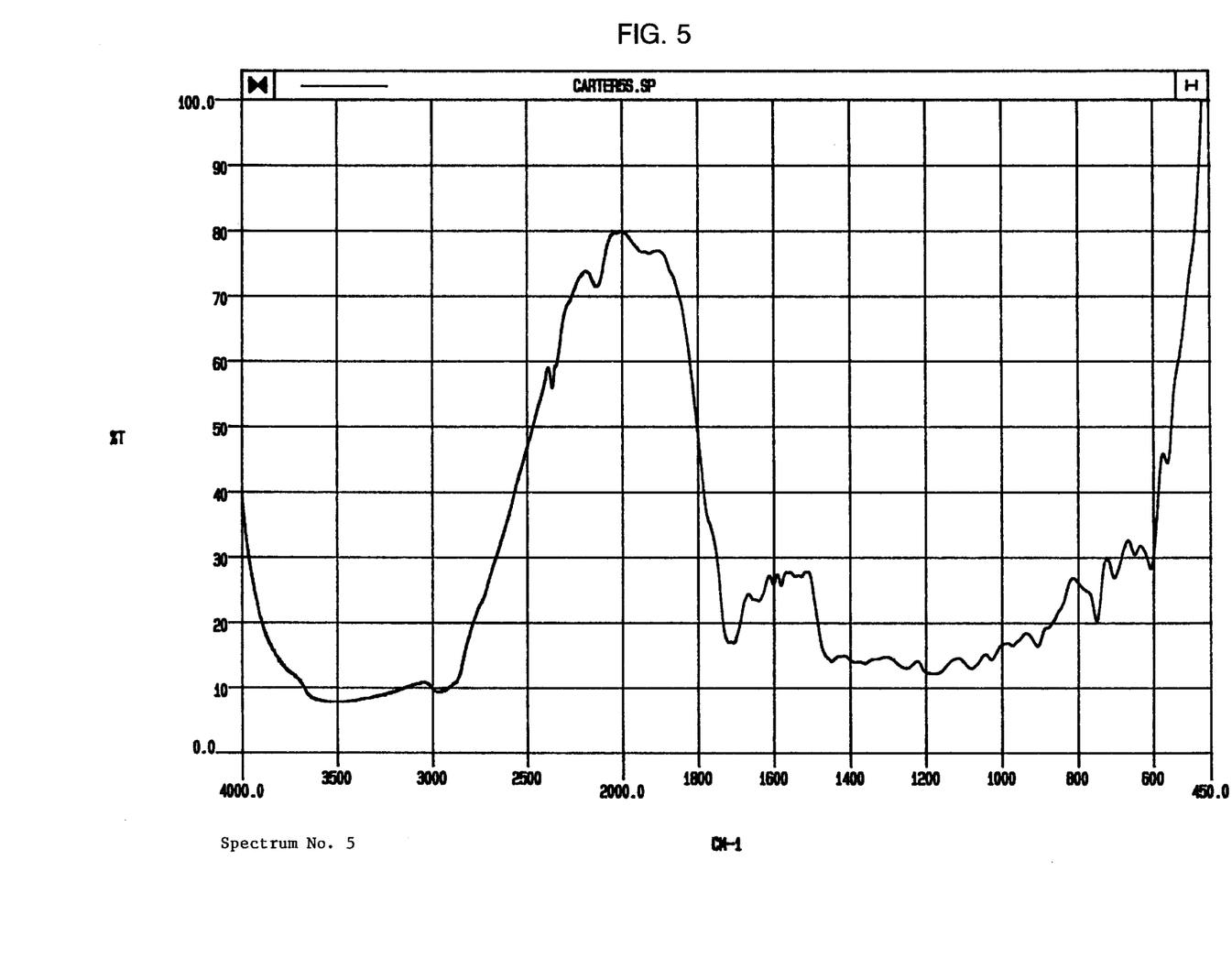
FIG. 5 is an infrared spectrum of the polymer of the present invention following resaturation.
Figure 6:
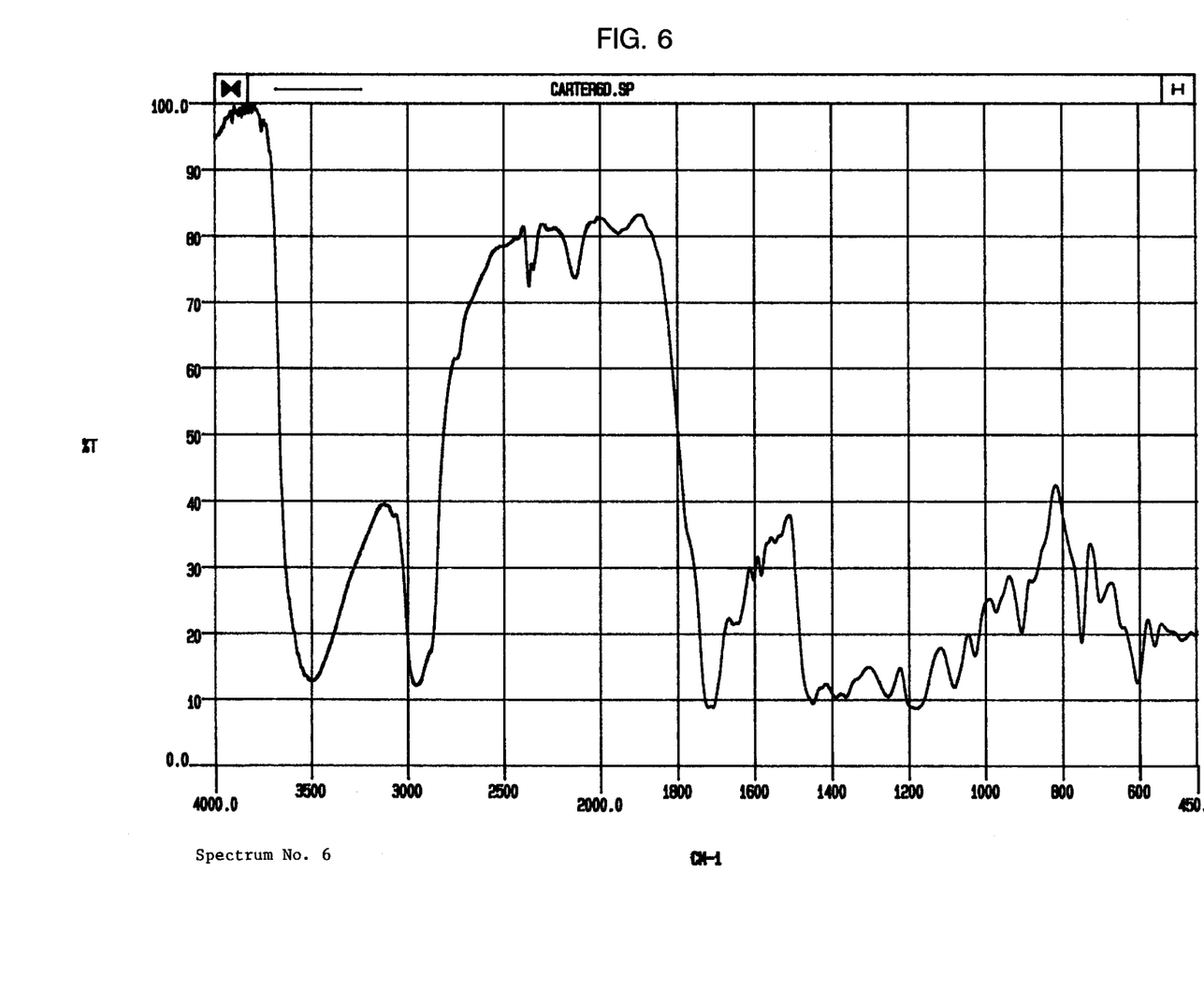
FIG. 6 is an infrared spectrum of the polymer of the present invention after redrying.

The peak around 1730 $cm^{-1}$ and a series of peaks from 1300 to 1000 $cm^{-1}$ are typical of carbonyl structures and the small peak around 2750 $cm^{-1}$ is typical of bonded hydroxyl in carboxylic acids. A small indication of C=C structures is present at 1450 and 900 $cm^{-1}$, with a peak around 2400 $cm^{-1}$ caused by $CO_2$ in the air.

The infrared spectra and weight measurements indicate that the polymer can reversibly adsorb and desorb water like a sponge without any change in its chemical characteristics. In addition, the physical characteristics remain unchanged, i.e., the polymer does not crack or dissolve. Even when dry, the spectra indicate a large amount of free hydroxyl and/or water.

The permeability and uniquely high ratio of free hydroxyl and/or water in the polymer allows for the transport of oxygen and water to be governed by the mechanism of bulk flow wherein groups of water molecules move in concert together through the pores of the polymer down the concentration gradient. As a contact lens, this permeability by capillary flow provides the eye with essential oxygen at levels above those of current hydrophilic soft contact lenses. The polymer exhibits oxygen permeability approaching that of a static layer of tears of equal thickness.

By incorporating a non-reactive diluent in the monomer mixture, the polymer can be produced with significantly higher expansion and swell rates using solution polymerization techniques. Thus, in the following example, a polymer having a water to solid ratio of 399:1 can be produced.

| 2-Hydroxyethyl methacrylate | 100 ml (25%) |
| Methacrylic acid | 100 ml (25%) |
| 2,5-Dimethyl-2,5-bis(2-ethylhexoyl-peroxy) hexane | 4 drops (0.0005%) |
| 1,4-Butanediol (diluent) | 200 ml (50%) |

The monomer/diluent solution is cast into a solid, film, sheet or membrane in an industrial convection oven at 90° C. for 30 minutes. Upon removal from the oven, the non-reactive diluent fraction is removed by extraction with water and the remaining polymer is either dried or equilibrated in solution as needed for the final article. Since the diluent is non-reactive, it forms no part of the final polymer. Rather, its role is in the nature of a spacer to spread the crosslinking of the polymer thereby increasing the number of hydroxyl sites available in the polymer skeleton. The result is a polymer structure capable of increased hydration and expansion with an even higher water to solid ratio resulting in a water content of up to 99.75%.

The solid polymer produced in this manner can be granulated for use in agriculture as a soil hydratant, or machined to form a soft contact lens which has an extremely low coefficient of friction between the lens and the eyelid and maintains corneal respiration at nearly uninterrupted levels with an oxygen permeability approaching that of a static layer of tears. Films or sheets of the polymer, when hydrated, are also suitable as bandages and burn dressings.

As noted, the polymer can also be produced in the shape or form of the final article, whether a film, coating, contact lens, membrane or sheet, or otherwise, by incorporating a radiation activated polymerization initiator, such as a photocatalyst, in a solvent free casting method. The following is an example of such a polymer which includes a trace amount of a longer chain ester crosslinking comonomer.

| 2-Hydroxyethyl methacrylate | 650 ml (49.96%) |
| Methacrylic acid | 430 ml (49.96%) |
| Cyclohexyl methacrylate | 1 ml (0.075%) |
| 2,2-Azobis(2-methylpropionitrile) | 5 gm (0.50%) |

The monomer mixture is poured, sprayed or otherwise applied to a surface or a chosen mold and is irradiated with ultraviolet light in the 320–380 nm range at room temperature. Other radiation sources, such as cobalt-60, may be used depending on the specific nature of the polymerization initiator. Cure rates for radiation catalyzed polymers are a function of the surface thickness, monomer activity and radiation intensity. Radiation catalysis of the monomer mixture is particularly useful where the polymer is desired to be formed in situ as a coating on an existing structure.

The macroporous hyperhydroxy polymer of the present invention is particularly useful in the manufacture of soft contact lenses, whether by direct casting or machining of a precast blank. The monomers combine to form a polymer skeleton having a high number of hydroxy sites so as to create, upon hydration, a material with a pore size of at least 90 Å. The large pore size allows for the transport of water and oxygen to be governed by the mechanism of bulk flow where groups of molecules move in concert through the polymer. This bulk flow transport is a significant improvement over other polymers used in soft contact lenses which are limited to molecular diffusion where only single molecules are capable of moving through the polymer pores. Thus the permeability of the macroporous hyperhydroxy polymer provides the eye with essential oxygen at levels heretofore not possible with other soft contact lens materials. In addition, the extremely low surface to volume ratio with the pore diameter of well over ten times the size of the essential transport elements the eye requires and an oxygen permeability approaching that of a static layer of tears of equal thickness aids in maintaining corneal respiration at nearly uninterrupted levels, resulting in longer wearing times for such contact lenses with reduced dryness of the eye.

In addition to use in the manufacture of contact lenses, the macroporous hyperhydroxy polymer of the present invention has utility in a wide variety of areas.

In aeronautics, the polymer may be used as an anti-icing material for airfoil surfaces to prevent ice buildup thereby increasing foul weather ground time for aircraft, improved friction reduction and reduced drag. As a coating, the polymer can be prepared as a thick slurry wherein the hydration is supplied by standard deicing glycols such as in FAA Type 2 deicing material. Polymerization of the slurry in place increases the adhesion time of the glycol thereby retarding reicing of the treated surfaces. The polymer coating also acts to lower the freezing point of the surface to which it is applied.

As a soil hydratant or seed coating, the macroporous hyperhydroxy polymer has a significant application in agriculture. It is a biosafe material which, unlike polyacrylamide polymer gels, can be used situations which are involved in the food chain. Thus, the polymer can be applied to seeds as a coating to protect against seed-borne and soil-borne pests as well as to prevent deterioration of the seed over long periods of storage. In addition, the granulated polymer, when mixed with soil, increases the aeration of the oil and also serves as a water reservoir due to its hyperhydroxy nature, thereby reducing the amount of water needed to irrigate crops, particularly in arid conditions.

Just as in aeronautical situations, the polymer also has utility in the protection of physical structures which may be threatened by climatic conditions. As a surface coating, film or paint, the polymer may be applied to structures such as electrical transmission towers as an anti-icing coating. In addition, it may be used in marine environments, on docks, oil platforms, vessels, etc., to retard the accumulation of marine encrustations.

A particularly novel application of the polymer of this invention is in the determination of the cycle of ovulation with a device consisting of only two parts. A cylinder of polymer is inserted into the vagina. Due to the hormonal, secretory and osmotic changes which occur during ovulation, the cylinder will change configuration and swell in diameter. The vaginally hydrated cylinder is removed after a period of time has elapsed and is measured by attempting to pass it through a template of standard diameter. If the patient is ovulating or otherwise in a fertile state, the cylinder will not fit through the template. No urine sample is required, no medical supervision is necessary, the device is potentially reusable and has an unlimited shelf life.

In the field of prosthetics, the polymer has utility in the manufacture of safe breast prostheses. As such, the polymer is prepared as a powder which is hydrated and placed in an encapsulated shell. The powder particle diameter can be varied to provide a variable density mammoplast. Due to the biocompatible nature of the polymer, the mammoplast can be used as an implant without the adverse effects attributed to other breast implants.

As dermatological dressings, the polymer, formed into membrane films and the like, can be used as burn dressings, artificial skin, protective bandages, etc. The significant feature of the material over current polyurethanes, is the ability, due to the high water content, of resisting cling thereby providing ease of debridement of wounds. In addition, the same bulk flow transport and permeability which maintains corneal respiration in contact lenses, provides for increased oxygenation and respiration of wound tissues when the polymer is used as a bandage.

As a spill recovery material, the unpolymerized monomer mixture can be dispersed onto spill areas, such as oil, toxic chemicals, etc., whether on water or land. As the monomer mixture polymerizes, it engages in a physical or chemical reaction with the spill material to absorb or encapsulate the spill or to create a new reaction product capable of easy removal from the surface leaving minimal spill residue.

Pore diameter of the polymer can be controlled by the use of longer chain crosslinking comonomers and diluents. By so doing, the polymer can be prepared as membranes and configured with selected pore diameters for use as separation membranes. In this manner the ionic macroporous diffusion properties can be exploited for the separation and transportation of chemicals to surfaces. In the field of biology, the membranes can be used to control the delivery of drugs and medicines, while in the laboratory or industrial procedures, the polymer has utility in the improved separation of chemical moieties.

The polymer also has utility as an electroconductive coating to improve circuit efficiency and the speed of data transmission. A coating of the polymer on electronic components provides a porous surface which can be filled with a liquid or gas component as an electroconductive hydratant. The particular electroconductive characteristics of the coating are determined by the nature of the hydratant.

The above embodiments illustrate the preferred embodiments of the present invention and it is understood that many variations and modifications of those embodiments will be evident to those skilled in the art and may be carried out without departing from the spirit and scope of the present invention.

What is claimed is:

1. A macroporous hyperhydroxy polymer formed from a mixture of functional acrylic monomers comprising;
    a) 40–60 parts by weight of a purified monoester of a hydroxyalkyl acrylate having a single olefinic double bond,
    b) 40–60 parts by weight of methacrylic acid,
    c) 0–5 parts by weight of a polymerization initiator,
        wherein the molar ratio of the purified monoester of hydroxyalkyl acrylate to the methacrylic acid is from 1:1 to 2.3:1, and the resulting macroporous hyperhydroxy polymer is characterized by having a water content of 90–99.75% when fully hydrated.

2. The polymer of claim 1 further comprising 0–0.1% by weight of an alkyl acrylate or methacrylate ester crosslinking comonomer.

3. The polymer of claim 1 wherein the monoester is selected from the group consisting of 2-hydroxyethyl methacrylate; glyceryl methacrylate; 2-hydroxypropyl methacrylate; 2-hydroxyethyl acrylate and 2-hydroxypropyl acrylate.

4. The polymer of claim 1 wherein the polymerization initiator is a difunctional peroxyester free radical initiator.

5. The polymer of claim 4 wherein the initiator is selected from the group consisting of 2,5-dimethyl-2,5-bis(2-ethylhexoylperoxy) hexane and tertiarybutyl peroxypivalate.

6. The polymer of claim 1 wherein the initiator is a UV catalyst selected from the group consisting of 2,2-azobis(2-methylpropionitrile) and azoisobutyronitrile (AIBN).

7. The polymer of claim 2 wherein the crosslinking comonomer is selected from the group consisting of cyclohexyl methacrylate; trimethylolpropane trimethacrylate and ethyleneglycol dimethacrylate.

* * * * *